US009860716B2

(12) United States Patent
Lee

(10) Patent No.: US 9,860,716 B2
(45) Date of Patent: Jan. 2, 2018

(54) FIRE EXTINGUISHER TRACKING AND NAVIGATION SYSTEM

(71) Applicant: Young W. Lee, Perrysburg, OH (US)

(72) Inventor: Young W. Lee, Perrysburg, OH (US)

( * ) Notice: Subject to any disclaimer, the term of this patent is extended or adjusted under 35 U.S.C. 154(b) by 0 days.

(21) Appl. No.: 15/088,046

(22) Filed: Mar. 31, 2016

(65) Prior Publication Data

US 2016/0292978 A1    Oct. 6, 2016

Related U.S. Application Data

(60) Provisional application No. 62/140,630, filed on Mar. 31, 2015.

(51) Int. Cl.
*G08B 1/08*    (2006.01)
*H04W 4/06*    (2009.01)
*G08B 7/06*    (2006.01)

(52) U.S. Cl.
CPC ............... *H04W 4/06* (2013.01); *G08B 1/08* (2013.01); *G08B 7/066* (2013.01)

(58) Field of Classification Search
CPC ....... H04W 4/06; H04W 8/005; H04W 4/008; G08B 17/12; G08B 17/125; A62C 37/50; A62C 13/00
USPC .................... 340/539.25, 628, 632
See application file for complete search history.

(56) References Cited

U.S. PATENT DOCUMENTS

| 6,768,424 B1* | 7/2004 | Morris ................... G08B 21/24 340/539.1 |
| 6,977,596 B1* | 12/2005 | Brown ..................... G08B 7/06 169/60 |
| 7,098,787 B2* | 8/2006 | Miller .................. G08B 25/016 340/539.13 |
| 7,382,271 B2* | 6/2008 | McFarland ............ G05B 15/02 340/539.2 |
| 7,881,862 B2* | 2/2011 | Pei ......................... G09B 29/10 340/511 |
| 2013/0134906 A1* | 5/2013 | Picariello ........... H05B 37/0245 315/312 |

* cited by examiner

*Primary Examiner* — Toan N Pham
(74) *Attorney, Agent, or Firm* — Mitchell Law PLLC; Matthew W. Mitchell

(57) ABSTRACT

Method and system is disclosed for tracking and navigating people to a fire extinguisher within a confined building.

18 Claims, 7 Drawing Sheets

FIRE EXTINGUISHER TRACKING AND NAVIGATION SYSTEM

CROSS-REFERENCE TO RELATED APPLICATIONS

This application claims the benefit of U.S. Provisional Application No. 62/140,630, filed Mar. 31, 2015 incorporated by reference herein.

TECHNICAL FIELD

This disclosure relates to fire safety systems for a building, and more particularly to systems and apparatus for locating the fire extinguisher in response to a smoke alarm.

BACKGROUND

The statements in this section merely provide background information related to the present disclosure and may not constitute prior art.

The use of smoke and fire alarms are known in the prior art. Conventional building fire safety systems include a number of fire detectors positioned throughout a building. Many known systems monitor signals from the detectors and, upon sensing an alarm condition, activate audible alarms or visual light, e.g., strobes, throughout the building.

Buildings also include firefighting equipment which is located in various locations throughout the building. The firefighting equipment is available for use by a first responder when they arrive at the building or by other personnel. The firefighting equipment, however, can be difficult to locate in low light or smoke filled situations which may occur during a building emergency. This inhibits the efforts of first responders, visitors, and building occupants in locating the firefighting equipment during an emergency.

Therefore, there is a need for a system and apparatus for aiding people to the fire extinguisher locations in response to a smoke alarm.

SUMMARY

Method and system is disclosed for tracking and navigating people to a fire extinguisher.

Certain embodiments of the invention include a feature of superimposing a route to a fire extinguisher based upon visual or audio information from a proximately located beacon.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
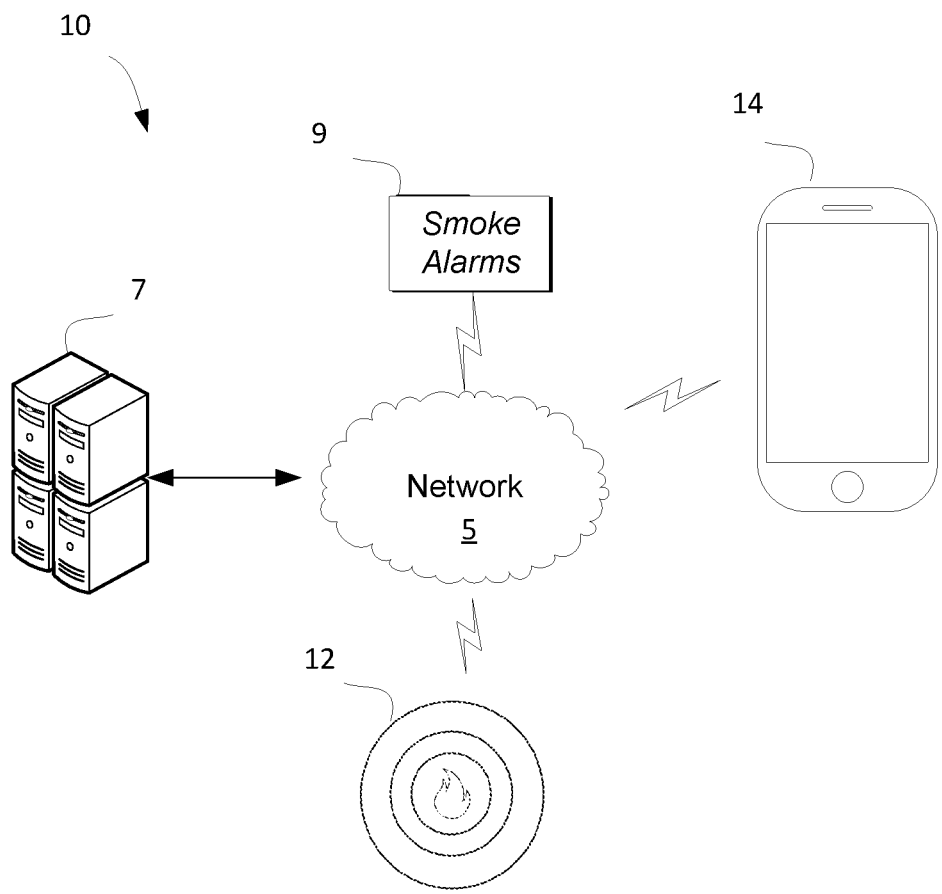
FIG. 1 schematically shows an exemplary fire extinguisher tracking and navigation system, in accordance with the present disclosure.

Various embodiments of the present invention will be described in detail with reference to the drawings, where like reference numerals represent like parts throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Referring now to the drawings, wherein the depictions are for the purpose of illustrating certain exemplary embodiments only and not for the purpose of limiting the same, FIG. 1 schematically shows an exemplary fire extinguisher tracking and navigation system 10 that may help implement the methodologies of the present disclosure. The system 10 includes a network 5, a server system 7, one or more smoke alarm devices 9, one or more identification and positioning beacons 12, and one or more mobile devices 14. In various implementations of the teachings herein, functions and operation of the server system 7 may be implemented in one or more of the smoke alarms, network devices, beacons, and/or mobile devices 14.

As shown in FIG. 1, the smoke alarms, beacons 12 and mobile devices 14 may be communicatively connected via the network 5. In various implementations, the various devices may be direct communicatively connected. For example, the smoke alarms and/or beacons may be configured to communicate among one another, via e.g., a distributed or mesh network. In various embodiments, the smoke alarms and beacons may be directly communicatively connected among one another, via e.g., a distributed or mesh network.

The server system 7 may be communicatively connected to the smoke alarm devices 9, the beacons 12, and the mobile devices 14 via the network 5. The mobile device 14 may be physically connected to the network 5 during selected periods of operation without departing from the teachings herein. Components of the system 10 are shown in FIG. 1 as single elements. Such illustration is for ease of description and it should be recognized that the system 10 may include multiple additional mobile and computing devices.

The network 5 may be any suitable series of points or nodes interconnected by communication paths. The network 5 may be interconnected with other networks and contain sub networks network such as, for example, a publicly accessible distributed network like the Internet or other telecommunications networks (e.g., intranets, virtual nets, overlay networks and the like). The network 5 may facilitates the exchange of data between and among the smoke alarm devices 9, the beacons 12, and the mobile devices 14, and the server 7, in various embodiments.

The server system 7 may be: various embodiments of a computer including high-speed microcomputers, minicomputers, mainframes, and/or data storage devices. The server system 7 preferably executes database functions including storing and maintaining a database and processes requests from the smoke alarm devices 9, the beacons 12, and the mobile devices 14 to extract data from, or update, a database as described herein below. The server 7 may additionally provide processing functions for the mobile device 14 as will become apparent to those skilled in the art upon a careful reading of the teachings herein.

In addition, the mobile device 14 may include one or more applications that the user may operate. Operation may include downloading, installing, turning on, unlocking, activating, or otherwise using the application. The application may comprise at least one of an algorithm, software, computer code, and/or the like, for example, mobile application software. In the alternative, the application may be a website accessible through the world wide web.

The smoke alarms 9 have smoke or fire detector capabilities. The smoke alarms 9 may detect fire or smoke using methods known in the art, e.g., via light analysis or chemical-based analysis, e.g., ionizing smoke detector. If desired, other types of smoke detector such as pyroelectric detectors, infrared light detectors, image-sensor (camera) based detectors, and other smoke detector structures may be used in implementing smoke detectors 9. The smoke alarms have audio and visual alarms that are broadcast in response to detection of smoke or fire. In various embodiments, the plurality of smoke alarms 9 are configurable to broadcast the alarm if any one of the plurality of smoke alarms detect smoke or fire. In various embodiments, the smoke alarms 9 include network adapters configured to communicate over the network 5.

Figure 2:
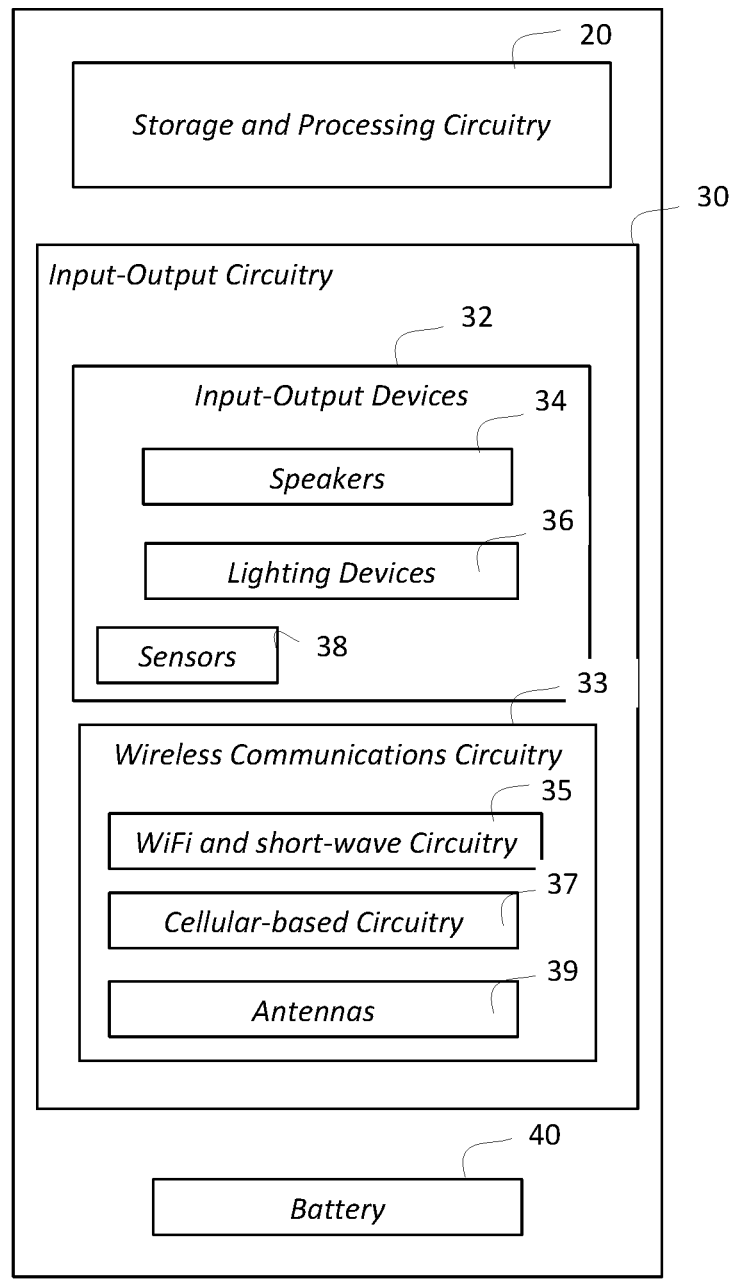
FIG. 2 schematically shows an exemplary identification and positioning beacon, in accordance with the present disclosure.

FIG. 2 schematically shows an exemplary identification and positioning beacon 12. As shown in FIG. 2, beacon 12 may include control circuitry such as storage and processing circuitry 20 such as hard disk drive storage, nonvolatile memory (e.g., flash memory or other electrically-programmable-read-only memory configured to form a solid state drive), volatile memory (e.g., static or dynamic random-access-memory), etc. The processing circuitry of the storage and processing circuitry 20 may be used to control the operation of the beacon 12. The processing circuitry may be based on one or more microprocessors, microcontrollers, digital signal processors, baseband processors, power management units, audio codec chips, application specific integrated circuits, etc.

The storage and processing circuitry 20 may be used to run software on beacon 12, such as operating system functions. To support interactions with external equipment, storage and processing circuitry 20 may be used in implementing communications protocols. Communications protocols that may be implemented using storage and processing circuitry 20 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Input-output circuitry 30 may be used to allow data to be supplied to beacon 12 and to allow data to be provided from beacon 12 to external devices. The input-output circuitry 30 may include input-output devices 32 such as buttons, light-emitting diodes and other status indicators, data ports, etc. Input-output devices 32 in circuitry 30 may include speakers 34, light-emitting components 36 such as a strobe or light-emitting diode, i.e., flash, and other input-output devices. Various embodiments may include one or more sensors 38, such as a microphone and/or light detecting device.

During operation, an admin-user can control the operation of a selected beacon 12 by supplying commands through input-output devices 32 and may receive status information and other output from beacon 12 using the output resources of input-output devices 32 e.g., audio from the speaker 34, flashes of light from flash 36, etc. This output may also be used in alerting a user about the detection of smoke by the smoke alarms 9 and to alert user's to the location of associated fire extinguishers.

Wireless communications circuitry 33 may include radio-frequency (RF) transceiver circuitry formed from one or more integrated circuits, power amplifier circuitry, low-noise input amplifiers, passive RF components, one or more antennas, filters, duplexers, and other circuitry for handling RF wireless signals. Wireless signals can also be sent using light (e.g., using infrared communications, e.g., LiFi®).

Wireless communications circuitry 33 may include local area network transceiver circuitry such as transceiver circuitry 35 may handle 2.4 GHz and 5 GHz bands for WiFi® (IEEE 802.11) communications and may handle the 2.4 GHz Bluetooth® communications band. Circuitry 33 may use cellular telephone transceiver circuitry 37 for handling wireless communications in cellular telephone bands such as bands in frequency ranges of about 700 MHz to about 2700 MHz or bands at higher or lower frequencies. Near field communications may also be supported (e.g., at 13.56 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 33 may have antenna structures such as one or more antennas 39. The antenna structures 39 may be formed using any suitable antenna types (e.g., inverted-F antennas, etc.).

The beacon 12 preferably includes a battery 40. However, as one skilled in the art would readily recognize, various embodiments may exclude the battery for a wired power source, or various known power sources, e.g., solar, the disclosure herein is not intended to be limited thereby. In various embodiments, the beacons 12 may include functionality of the smoke alarms 9.

Figure 3A:
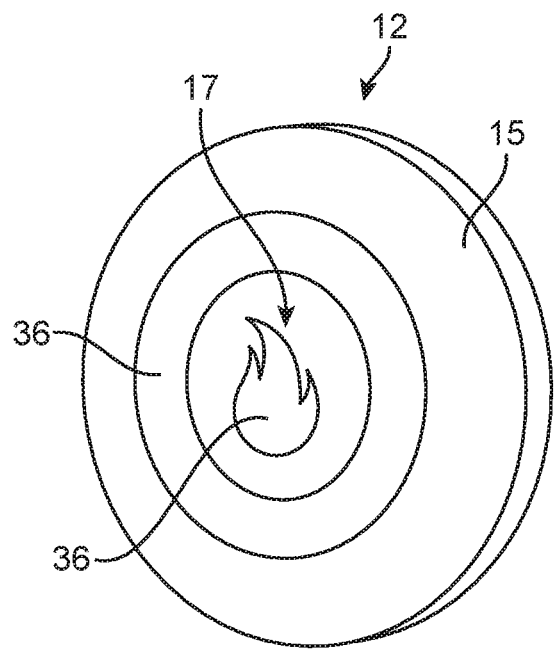
FIGS. 3A-3C show various views of the exemplary beacon, in accordance with the present disclosure.
Figure 3B:
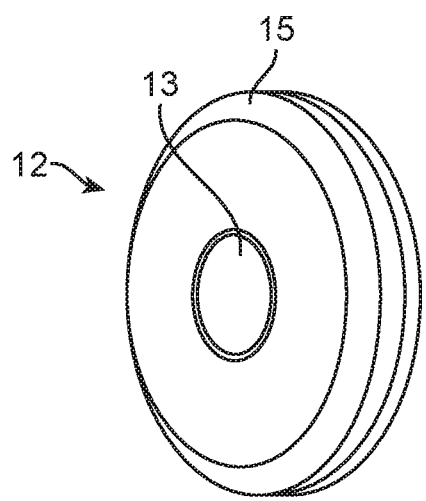
Figure 3C:
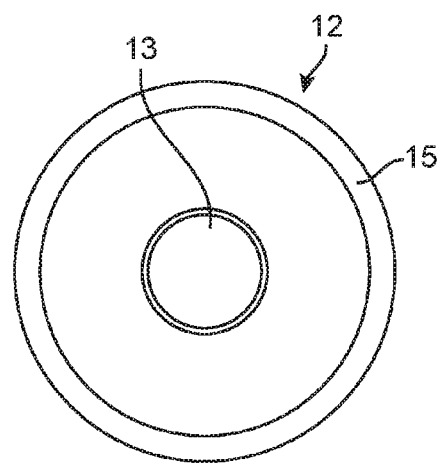
Figure 4:
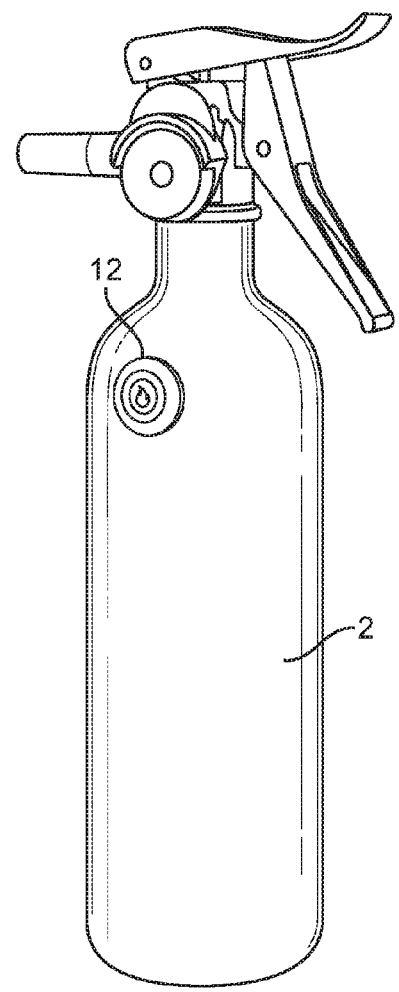
FIG. 4 shows an exemplary beacon positioned on a fire extinguisher, in accordance with the present disclosure.

FIGS. 3A-3C show various views of the exemplary beacon 12. FIG. 4 shows an exemplary beacon 12 positioned on a fire extinguisher 2. As FIGS. 3A-3C show, the beacon 12 includes a housing 15 configured to contain internal components, e.g., circuitry and/or a battery, and to hold a magnet 13 and the lighting device 36. As shown in FIG. 3A, the lighting device 36 may be formed into a shape such as a flame. In various embodiments, the lighting device 36 is positioned within the housing 15 and a shaped-molding portion 17 so as to illuminate a section having a shape, e.g., a flame shape. The shaped-molding portion 17 may be semi-transparent.

Referring to FIG. 4, an exemplary fire extinguisher 2 is shown. The conventional fire extinguisher 2 includes a cylinder, a handle and a pin. The handle comprises two arms which provide the activation means when the pin is removed. Upon directing the fire extinguisher 2 at a fire and actuating the arms, a stream of fire retardant material is released from the cylinder in which to extinguish the fire. The cylinder is generally formed of a metal material having magnetic properties by which one could affix a magnet. As FIG. 4 shows, the beacon 12 may be affixed to a fire extinguisher 2 using the magnet 13. In this way, location data broadcast by the beacon 12 may navigate a user to the fire extinguisher.

Figure 5:
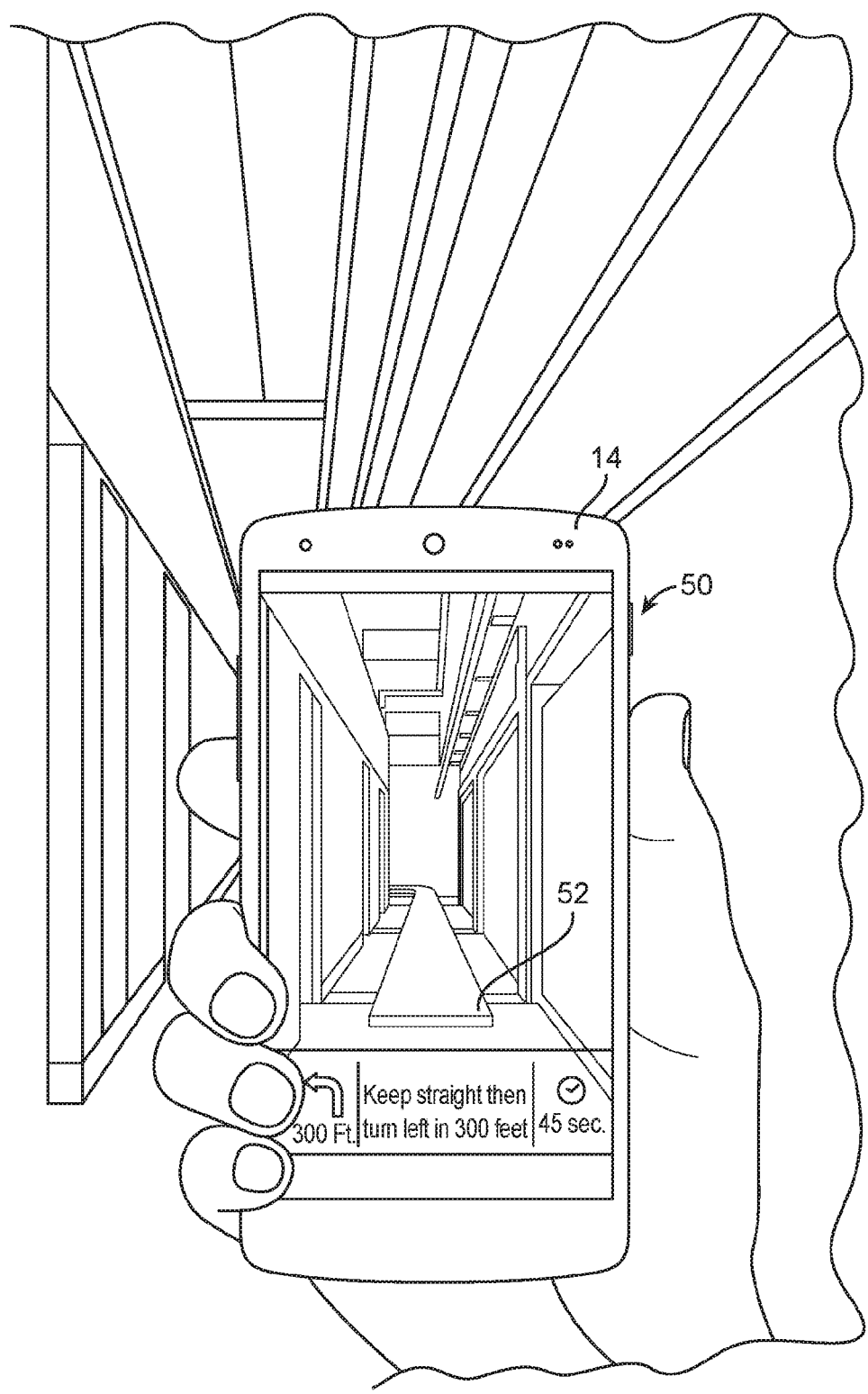
FIG. 5 shows an exemplary graphical user interface, in accordance with the present disclosure.

FIG. 5 shows an exemplary graphical user interface 50. In operation, upon detection of smoke or other fire indicating event, the smoke alarms 9 broadcast a visual or audio alarm. The beacons 12 may detect that the smoke alarms 9 have detected a fire by audio analysis. For example, sounds above a predetermined threshold, sounds having a predetermined threshold for a predetermined time period, and/or repeating alarm-type sounds, e.g., sound signatures. In some embodiments, the fire alarms 9 may transmit data indicating an alarm that may be received by the beacons 12.

Upon detection or by direct alerting of a fire or fire-type emergency, the beacons may broadcast audio, visual, and/or data signals for mobile devices 14 and building occupants. The mobile devices 14 may be configured to use the visual, sound, and data signals to locate a beacon 12 and hence a fire extinguisher 2. In various embodiments, the mobile device may utilize positioning, navigation or object identification software to construct a route or path based upon visual information, e.g., a hallway. In order to determine a route, the mobile device may utilize positioning of the mobile device and positioning data associated with one or more beacons to determine a path. In one embodiment, the mobile device may receive positioning or route information from the server system based upon position of the mobile device for superimposing over the real-time video stream. In one embodiment, positioning/location data and data associated with an orientation of the mobile device is utilized to superimpose the route or path in the video stream. Orientation may be determined using various gyroscopic devices and/or accelerometer devices.

In one embodiment, the beacon 12 is configured to determine and broadcast location date. In one embodiment, the mobile device 14 is configured to provide a path or route to a nearest beacon 12. In one embodiment, the mobile device 14 is configured to navigate around inaccessible beacons. In one embodiment, the mobile device 14 is configured to determine position of the beacons based upon building plans and/or preloaded location information.

As FIG. 5 shows, upon determining a route 52, the mobile device 14 superimposes a route on a video stream in real time. In this way, a user may follow the superimposed route to quickly navigate to a beacon 12 and its associated fire extinguisher 2 within a confined building. It is contemplated herein that a user may utilize the video stream in differently formed mobile devices such as an eyewear-based or head-engaging mobile device.

Example System Architecture

Figure 6:
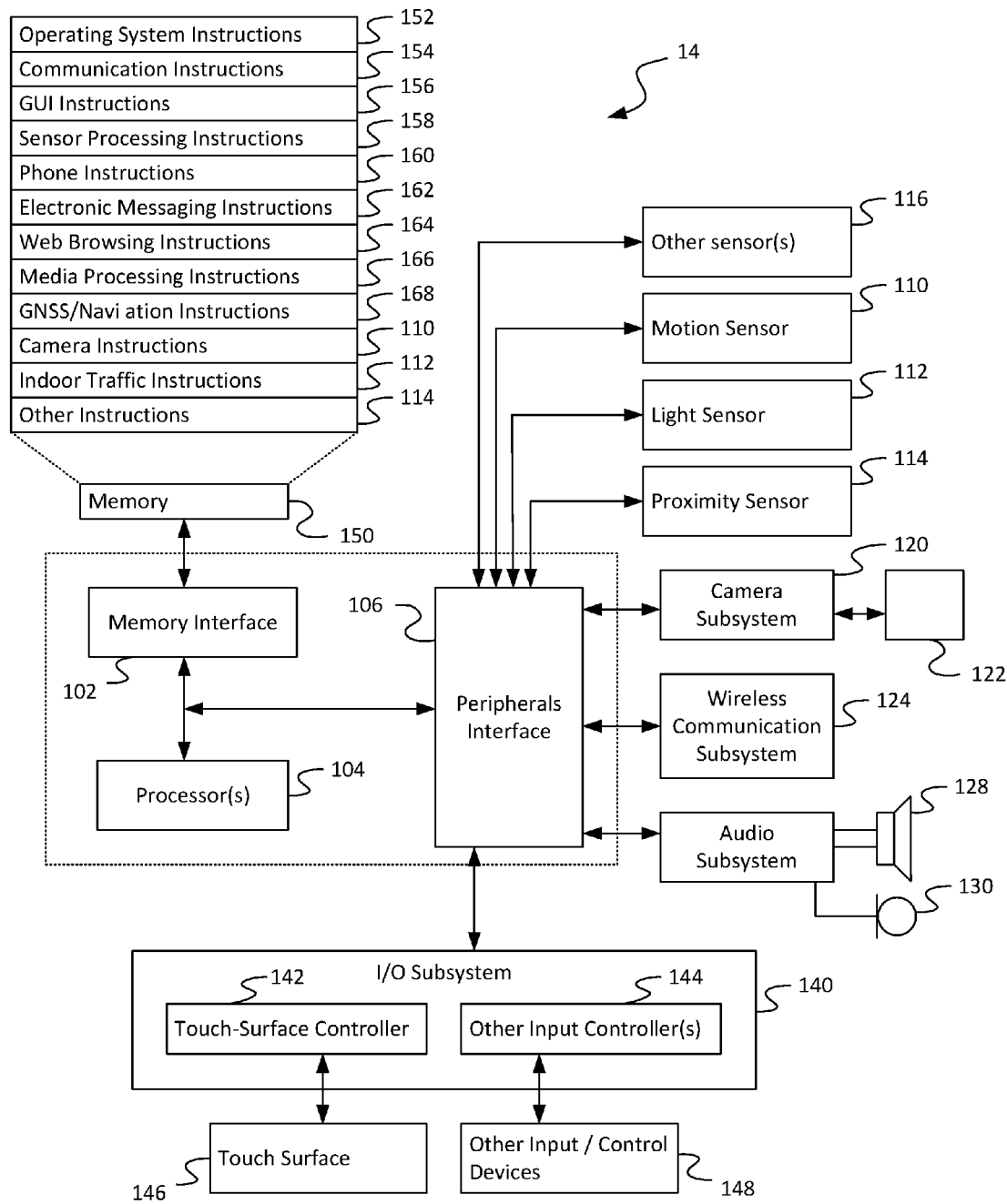
FIG. 6 is a block diagram of an example computing device that can implement the features and processes of FIGS. 1-5 and 7, in accordance with the present disclosure.

FIG. 6 is a block diagram of an example computing device 14 that can implement the features and processes of FIGS. 1-5. The computing device 14 can include a memory interface 102, one or more data processors, image processors and/or central processing units 104, and a peripherals interface 106. The memory interface 102, the one or more processors 104 and/or the peripherals interface 106 can be separate components or can be integrated in one or more integrated circuits. The various components in the computing device 14 can be coupled by one or more communication buses or signal lines.

Sensors, devices, and subsystems can be coupled to the peripherals interface 106 to facilitate multiple functionalities. For example, a motion sensor 110, a light sensor 112, and a proximity sensor 114 can be coupled to the peripherals interface 106 to facilitate orientation, lighting, and proximity functions. Other sensors 116 can also be connected to the peripherals interface 106, such as a global navigation satellite system (GNSS) (e.g., GPS receiver), a temperature sensor, a biometric sensor, magnetometer or other sensing device, to facilitate related functionalities.

A camera subsystem 120 and an optical sensor 122, e.g., a charged coupled device (CCD) or a complementary metal-oxide semiconductor (CMOS) optical sensor, can be utilized to facilitate camera functions, such as recording photographs and video clips and supplying a real-time video stream upon the display. The camera subsystem 120 and the optical sensor 122 can be used to collect images of a user to be used during authentication of a user, e.g., by performing facial recognition analysis.

Communication functions can be facilitated through one or more wireless communication subsystems 124, which can include radio frequency receivers and transmitters and/or optical (e.g., infrared) receivers and transmitters. The specific design and implementation of the communication subsystem 124 can depend on the communication network(s) over which the computing device 14 is intended to operate. For example, the computing device 14 can include communication subsystems 124 designed to operate over a GSM network, a GPRS network, an EDGE network, a Wi-Fi or WiMax network, and a Bluetooth™ network. In particular, the wireless communication subsystems 124 can include hosting protocols such that the device 14 can be configured as a base station for other wireless devices.

An audio subsystem 126 can be coupled to a speaker 128 and a microphone 130 to facilitate voice-enabled functions, such as speaker recognition, voice replication, digital recording, and telephony functions. The audio subsystem 126 can be configured to facilitate processing voice commands, voiceprinting and voice authentication, for example.

The I/O subsystem 140 can include a touch-surface controller 142 and/or other input controller(s) 144. The touch-surface controller 142 can be coupled to a touch surface 146. The touch surface 146 and touch-surface controller 142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 146.

The other input controller(s) 144 can be coupled to other input/control devices 148, such as one or more buttons, rocker switches, thumb-wheel, infrared port, USB port, and/or a pointer device such as a stylus. The one or more buttons (not shown) can include an up/down button for volume control of the speaker 128 and/or the microphone 130.

In one implementation, a pressing of the button for a first duration can disengage a lock of the touch surface 146; and a pressing of the button for a second duration that is longer than the first duration can turn power to the computing device 14 on or off. Pressing the button for a third duration can activate a voice control, or voice command, module that enables the user to speak commands into the microphone 130 to cause the device to execute the spoken command. The user can customize a functionality of one or more of the buttons. The touch surface 146 can, for example, also be used to implement virtual or soft buttons and/or a keyboard.

The memory interface 102 can be coupled to memory 150. The memory 150 can include high-speed random access memory and/or non-volatile memory, such as one or more magnetic disk storage devices, one or more optical storage devices, and/or flash memory (e.g., NAND, NOR). The memory 150 can store an operating system 152, such as Darwin, RTXC, LINUX, UNIX, OS X, WINDOWS, or an embedded operating system such as VxWorks.

The operating system 152 can include instructions for handling basic system services and for performing hardware dependent tasks. In some implementations, the operating system 152 can be a kernel (e.g., UNIX kernel). In some implementations, the operating system 152 can include instructions for generating mobile device location and speed estimates. For example, operating system 152 can implement the indoor traffic and user service enhancement features as described with reference to FIGS. 1-5.

The memory 150 can also store communication instructions 154 to facilitate communicating with one or more additional devices, one or more computers and/or one or more servers. The memory 150 can include graphical user interface instructions 156 to facilitate graphic user interface processing; sensor processing instructions 158 to facilitate sensor-related processing and functions; phone instructions 160 to facilitate phone-related processes and functions; electronic messaging instructions 162 to facilitate electronic-messaging related processes and functions; web browsing instructions 164 to facilitate web browsing-related processes and functions; media processing instructions 166 to facilitate media processing-related processes and functions; GNSS/Navigation instructions 168 to facilitate GNSS and navigation-related processes and instructions; and/or camera instructions 110 to facilitate camera-related processes and functions.

The memory 150 can store other software instructions 112 to facilitate other processes and functions, such as the indoor traffic and user service enhancement processes and functions as described with reference to FIGS. 1-5.

The memory 150 can also store other software instructions 114, such as web video instructions to facilitate web video-related processes and functions; and/or web shopping instructions to facilitate web shopping-related processes and functions. In some implementations, the media processing instructions 166 are divided into audio processing instructions and video processing instructions to facilitate audio processing-related processes and functions and video processing-related processes and functions, respectively. An activation record and International Mobile Equipment Identity (IMEI) 114 or similar hardware identifier can also be stored in memory 150.

Each of the above identified instructions and applications can correspond to a set of instructions for performing one or more functions described above. These instructions need not be implemented as separate software programs, procedures, or modules. The memory 150 can include additional instructions or fewer instructions. Furthermore, various functions of the computing device 14 can be implemented in hardware and/or in software, including in one or more signal processing and/or application specific integrated circuits.

Figure 7:
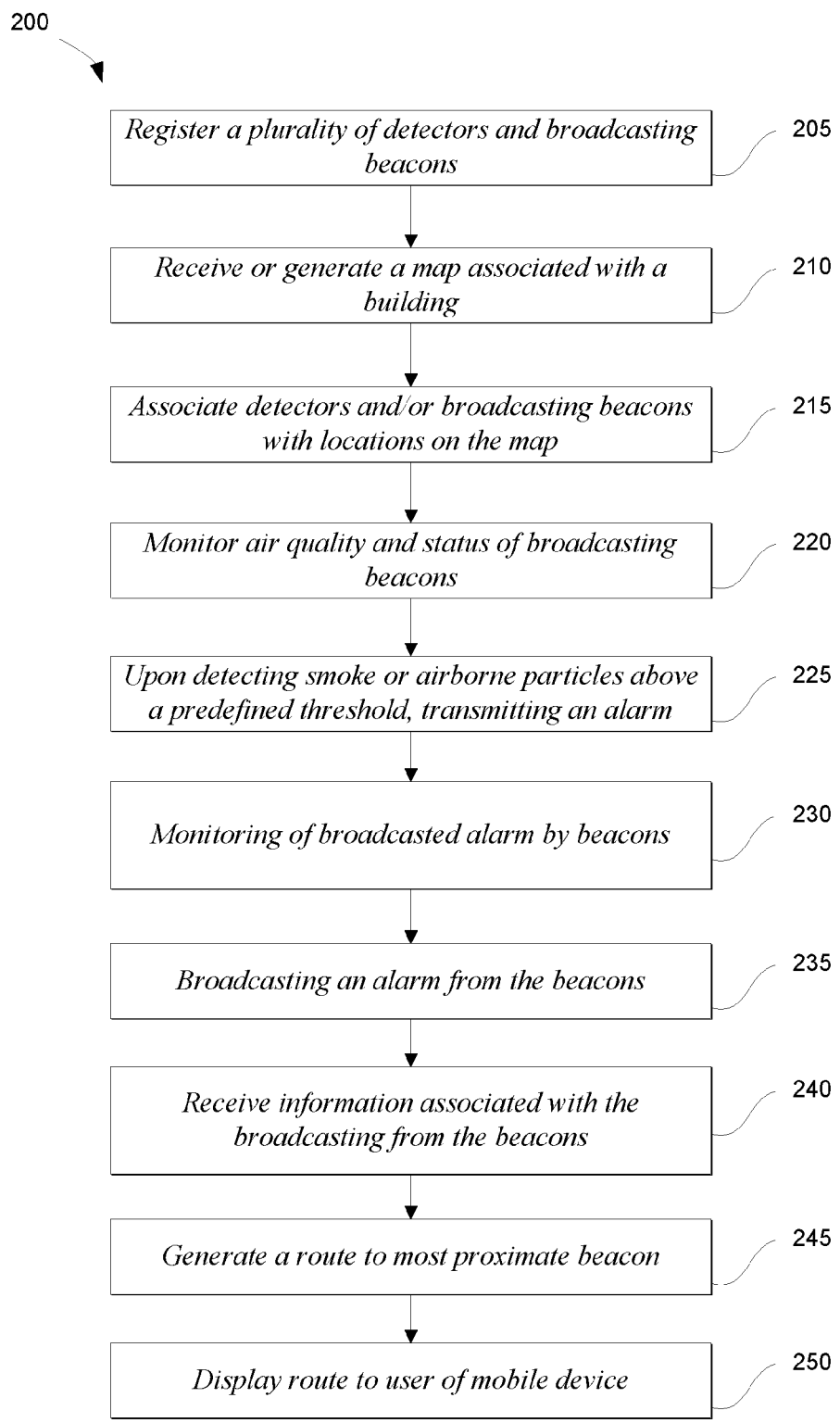
FIG. 7 is an exemplary process that may be executed consistent with the teachings herein.

FIG. 7 shows an exemplary process 200 that may be executed on the exemplary computing device 14. As FIG. 7 shows, the process may be initialized at step 205 whereat a plurality of airborne particle detectors, smoke detectors and/or a plurality of broadcasting beacons are registered with the system. Registering detectors and broadcasting beacons may be iteratively executed and may include assigning a location and an addressing identification, e.g., an IP address. At step 210, the process 200 may map generate or receive mapping information associated with an interior of the building. In one embodiment, the process 200 is configured to generate a map based upon received input from a user. In one embodiment, the process may be configured to receive or upload a generated map from a user. Maps may correspond with GPS data.

At step 215, the plurality of detectors and broadcasting beacons may be associated with locations within the map. In one embodiment, a user may send information associating detector and broadcasting beacons locations within the map. In one embodiment, GPS data may be used by a user to assign locations within the map. For example, a user may initialize a building location and selectively associate the position with a detector or beacon.

At step 220, the process 200 includes monitoring for airborne particles and/or smoke above one or more thresholds. In one embodiment, the process 200 may include monitoring a status of the broadcasting beacons, e.g., whether they are in an ON operating state and/or whether they are attached to a metallic or ferrous surface.

At step 225, upon detecting one or more airborne particles or smoke greater than a predefined threshold, the process 200 includes transmitting an audio or visual alarm. At step 230, the broadcasting beacons determines that the detectors are transmitting an alarm. Determining that the detectors are transmitting an alarm may be executed based upon monitored audio signals, radio or light signals, and/or other wireless digital data or analog signals.

At step 235, upon determining that the detectors are transmitting an alarm, the beacons may broadcast audio, visual, and/or data signals for the mobile devices 14 and building occupants. The broadcast may supplement and/or expand on any alarms given by the detectors. In one embodiment, the detectors transmit audio alarms, while the beacons transmit visual alarms and data signals to one or more computing devices such as the mobile device 14.

At step 240, the mobile device receives broadcasting alarms from one or more beacons. The mobile device 14 may compare location information from the one or more beacons with a location associated with the mobile device.

At step 245, the mobile device 14 generates a route to a beacon most proximate to the mobile device's location. The route may be generated based upon the generated or received map of the building's interior.

At step 250, the route is displayed to the user of the mobile device 14. As described herein above, the route may be superimposed on a video stream in real-time or displayed as a conventional two-dimensional map that includes indicia for the user and the beacon along with identifying map information, e.g., hallways, doors, and the generated route.

The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

Many different arrangements are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention. Further, it will be understood that certain features and subcombinations are of utility and may be employed without reference to other features and subcombinations and are contemplated within the scope of the claims. Not all steps listed in the various figures and description need be carried out in the specific order described. The description should not be restricted to the specific described embodiments.

The invention claimed is:

1. A computer system for providing navigation assistance to a broadcasting beacon, the computer system comprising:
one or more airborne particle detectors configured to monitor for airborne particles and to broadcast an alarm upon affirmative detection of the airborne particles greater than a predetermined threshold;
a plurality of broadcasting beacons comprising one or more computer processors, one or more computer readable storage media, and a broadcasting device;
program instructions stored on the computer readable storage media for execution by at least one of the one or more processors, the program instructions comprising:
program instructions to broadcast a second alarm upon affirmative detection of a monitored broadcasted alarm from one or the airborne particle detectors;
program instructions to provide locational information when broadcasting the second alarm; and
program instructions to control an operating state of the broadcasting beacons based upon detection of a metallic or ferrous surface.

2. The computer system of claim 1, wherein the operating state of the broadcasting beacons are transitioned to an ON operating state upon detection of a metallic or ferrous surface.

3. The computer system of claim 1, further comprising:
program instructions to communicate with a mobile device.

4. The computer system of claim 3, wherein the mobile device includes program instructions to provide navigational information in response to provided locational information from at least one of the plurality of broadcasting beacons.

5. The computer system of claim 4, wherein the provided navigational information is provided based upon physical proximity to the mobile device.

6. The computer system of claim 5, wherein the provided navigational information is superimposed graphically over a real-time video stream.

7. The computer system of claim 6, wherein the superimposed graphically comprises overlaying a route path over a real-time video stream.

8. The computer system of claim 7, wherein the provided navigational information is further provided based upon a broadcasting beacons physical proximity to the airborne particle detector which first broadcast the broadcasted alarm.

9. An electronic device, comprising:
a display;
one or more processors;
memory; and
one or more programs, wherein the one or more programs are stored in the memory and configured to be executed by the one or more processors, the one or more programs including instructions for:
while receiving broadcasting information from one or more broadcasting beacons, wherein the one or more broadcasting beacons are each operable when affixed magnetically to a fire extinguisher comprised of metallic or ferrous material, indicating an emergency state:
receiving interior mapping information;
determining location of the electronic device based upon the received interior mapping information;

receiving locational information from the one or more broadcasting beacons that corresponds to the interior mapping information;

determining a path to one of the one or more broadcasting beacons;

displaying a user interface that includes a real-time video stream; and superimposing a route path over the real-time video stream.

10. The electronic device of claim 9, wherein the one or more broadcasting beacons are configured to detect airborne particles above a predefined threshold associated with smoke.

11. The electronic device of claim 9, wherein the one or more broadcasting beacons are each configured to broadcast an audio signal upon detection of airborne particles above a predefined threshold associated with smoke and when affixed magnetically to a fire extinguisher comprised of metallic or ferrous material.

12. The electronic device of claim 9, wherein the superimposing the route path over the real-time video stream is executed based upon physical orientation of the electrical device.

13. The electronic device of claim 12, wherein the superimposing the route path over the real-time video stream is further executed based upon received information from an accelerometer of the electronic device.

14. A computer system for providing navigation assistance, the computer system comprising:

a plurality of broadcasting beacons comprising one or more computer processors, one or more computer readable storage media, a broadcasting device, and one or more smoke detectors;

program instructions stored on the computer readable storage media for execution by at least one of the one or more processors, the program instructions comprising:

program instructions to monitor for smoke;

program instructions to broadcast an alert upon affirmative detection of the smoke greater than a predetermined threshold;

program instructions to monitor for the broadcasted alert;

program instructions to broadcast the alert upon affirmative detection of the monitored broadcasted alert from another broadcasting beacon; and program instructions to provide locational information when broadcasting the alert and when detection of metallic or ferrous surface is detected.

15. The system of claim 14, wherein the one or more broadcasting beacons are configured to detect airborne particles above the predefined threshold associated with smoke.

16. The system of claim 14, wherein the one or more broadcasting beacons are each operable when affixed magnetically to a fire extinguisher comprised of metallic or ferrous material and, wherein the one or more broadcasting beacons are each configured to broadcast an audio signal upon detection of smoke above the predefined threshold associated with smoke and when affixed magnetically to a fire extinguisher comprised of metallic or ferrous material.

17. The system of claim 14, further comprising: program instructions to superimpose a route path over a real-time video stream based upon physical orientation of an electrical device.

18. The system of claim 17, wherein the superimposing the route path over the real-time video stream is further executed based upon received information from an accelerometer of the electronic device.

* * * * *